C. J. WILSON.
SAWS.

No. 193,740. Patented July 31, 1877.

WITNESSES:
Francis McArdle.
J. H. Scarborough.

INVENTOR:
C. J. Wilson.
BY
ATTORNEYS.

UNITED STATES PATENT OFFICE.

CHRISTOPHER J. WILSON, OF MACON, GEORGIA.

IMPROVEMENT IN SAWS.

Specification forming part of Letters Patent No. 193,740, dated July 31, 1877; application filed April 2, 1877.

*To all whom it may concern:*

Figure 1:
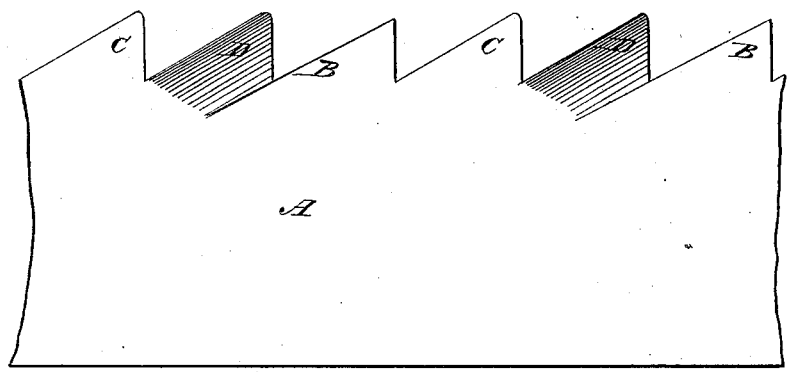
Figure 2:

Be it known that I, CHRISTOPHER JENKINS WILSON, of Macon, in the county of Bibb and State of Georgia, have invented a new and useful Improvement in Saws, of which the following is a specification:

Figure 1 is a side view of a portion of one of my improved saws. Fig. 2 is an edge view of the same.

Similar letters of reference indicate corresponding parts.

The object of this invention is to furnish saws which will run easier, and cut faster and smoother than ordinary saws, which may be made of any desired size or kind, and will be applicable to any desired kind of work.

The invention consists in constructing a saw with cutting-teeth, each of which is beveled on one entire side or face from base to point, which are vertical on one edge and inclined on the other to the length or radii of the saw, according as it is a reciprocating or circular saw.

The invention also consists in combining with these cutting-teeth clearer-teeth, which are of less length, but placed in line with the saw-plate, and have a vertical and inclined side, similarly to the cutting-teeth, as hereinafter described.

A represents the plate of the saw, the teeth of which are arranged in sets of three to a set. B is the clearing-tooth, which is vertical on one side, and a little lower than the cutting-teeth C D. The teeth C are inclined or beveled upon the right-hand side, and the teeth D upon the left-hand side, from the base to the point, as shown in Figs. 1 and 2. The points of the cutting-teeth C D are rounded off, as shown in Fig. 1, to adapt them to cut in place of tearing the fiber of the wood, and to avoid the liability of the points being broken off.

In filing a cutting-tooth, very little skill is required, since the file is laid flat against the beveled side, with its lower edge resting upon the inclined edge of the next tooth, which thus serves as a guide.

I am aware it is not new to provide a saw with teeth beveled from base to point, in opposite directions on the same side; nor to provide a saw with clearer-teeth, which are vertical, or nearly so, on one side, and I do not claim such construction.

Having thus described my invention, I claim as new and desire to secure by Letters Patent—

The combination, on a saw with two adjacent round-pointed cutters, C D, beveled from base to point on opposite sides, of an advance clearing-tooth, B, in line with plate A, and lower than cutting-teeth, as shown and described, for the purpose specified.

CHRISTOPHER J. WILSON.

Witnesses:
JAS. GREENE,
E. M. WILSON.